(12) United States Patent
Ogawa et al.

(10) Patent No.: US 12,467,897 B2
(45) Date of Patent: Nov. 11, 2025

(54) ELECTROPHORESIS DEVICE AND BIOLOGICAL SUBSTANCE RECOVERY METHOD

(71) Applicant: HITACHI HIGH-TECH CORPORATION, Tokyo (JP)

(72) Inventors: Mima Ogawa, Tokyo (JP); Takahide Yokoi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 381 days.

(21) Appl. No.: 18/040,857

(22) PCT Filed: Sep. 2, 2020

(86) PCT No.: PCT/JP2020/033293
§ 371 (c)(1),
(2) Date: Feb. 7, 2023

(87) PCT Pub. No.: WO2022/049674
PCT Pub. Date: Mar. 10, 2022

(65) Prior Publication Data
US 2023/0349856 A1 Nov. 2, 2023

(51) Int. Cl.
*G01N 27/447* (2006.01)
*C12N 15/10* (2006.01)

(52) U.S. Cl.
CPC ..... *G01N 27/44739* (2013.01); *C12N 15/101* (2013.01)

(58) Field of Classification Search
CPC .............. G01N 27/44739; C12N 15/101
See application file for complete search history.

(56) References Cited

U.S. PATENT DOCUMENTS

| 5,304,488 A | * | 4/1994 | Cohen | ............. C12M 47/06 435/308.1 |
| 5,538,614 A | * | 7/1996 | Han | ............. G01N 27/4473 204/462 |

(Continued)

FOREIGN PATENT DOCUMENTS

| JP | 2004-290109 A | 10/2004 |
| JP | 2010-502962 A | 1/2010 |

(Continued)

OTHER PUBLICATIONS

Englsih langauage translation of the Writen Opinion for international application No. PCT/JP2020/033293 , date of mailing Oct. 20, 2020. (Year: 2020).*

(Continued)

*Primary Examiner* — Alexander S Noguerola
(74) *Attorney, Agent, or Firm* — Baker Botts L.L.P.

(57) ABSTRACT

An electrophoresis device is used to separate a biological substance using a separation medium. A recovery hole configured to recover the separated target biological substance is formed in an electrophoresis device, the recovery hole is configured to be capable of accommodating a solvent that can suspend the target biological substance, a buffer tank configured to accommodate a buffer solution is provided below the recovery hole, and a membrane is disposed between the recovery hole and the buffer tank.

11 Claims, 3 Drawing Sheets

(56) References Cited

U.S. PATENT DOCUMENTS

| | | | | |
|---|---|---|---|---|
| 5,635,045 A | * | 6/1997 | Alam | G01N 27/4473 |
| | | | | 204/462 |
| 9,719,961 B2 | | 8/2017 | Sabin et al. | |
| 2006/0134620 A1 | * | 6/2006 | Hirai | C12N 15/101 |
| | | | | 536/25.4 |
| 2008/0057557 A1 | | 3/2008 | Margalit | |
| 2010/0270159 A1 | * | 10/2010 | Doucette | B01D 57/02 |
| | | | | 204/600 |

FOREIGN PATENT DOCUMENTS

| | | |
|---|---|---|
| JP | 2011-502243 A | 1/2011 |
| WO | WO 2004/048398 A1 | 6/2004 |

OTHER PUBLICATIONS

International Search Report, mailed Oct. 20, 2020, for International Application No. PCT/JP2020/033293.
Written Opinion of the International Search Authority, mailed Oct. 20, 2020, for International Application No. PCT/JP2020/033293 (without English translation).

* cited by examiner

ELECTROPHORESIS DEVICE AND BIOLOGICAL SUBSTANCE RECOVERY METHOD

TECHNICAL FIELD

The present invention relates to an electrophoresis device and a biological substance recovery method. As an example, the present invention relates to a method for easily recovering only a target substance from some biological substances by electrophoresis as a high-purity and high-concentration recovery liquid.

BACKGROUND ART

A gel electrophoresis method is a technique for analyzing biological substances such as a nucleic acid and a protein by utilizing a phenomenon that a substance moves in an electrode direction of opposite polarity when an electric field is applied to a charged substance. In general, an electrophoresis gel such as an agarose gel or an acrylamide gel is used as a support of biological substances. Since a moving speed in the electrophoresis gel varies depending on a molecular weight of a biological substance, biological substances are separated as bands that differ for each molecular weight. The gel electrophoresis method has high resolution for separation of biological substances, and thus, is also employed for separating and recovering a biological substance having a target molecular weight from a biological substance having another molecular weight.

As a method for recovering a biological substance having a target molecular weight, a method of excising a target band separated by electrophoresis together with a surrounding electrophoresis gel, and recovering the biological substance from the excised electrophoresis gel is generally employed. However, when the biological substance is recovered from the excised electrophoresis gel, there has been a problem that the concentration of the biological substance changes or a process for the excision is additionally required.

As a method in which it is unnecessary to excise an electrophoresis gel and a target biological substance is recovered simultaneously with electrophoresis, for example, PTLs 1 and 2 disclose that a recovery hole for a biological substance is provided in an electrophoresis gel in advance. The method with forming the recovery hole in the biological substance has an advantage that there is no possibility of contamination since an unnecessary substance that migrates earlier than the target biological substance passes through the recovery hole and continues migration. However, for the same reason, the target biological substance also easily passes through the recovery hole, and there is a problem that it is difficult to expect a high recovery rate of the target biological substance.

Similarly, as a method for recovering a target biological substance simultaneously with electrophoresis, for example, PTL 3 discloses a method in which a flow channel of electrophoresis is bifurcated, and only a target biological substance is moved to a recovery chamber by switching of an electrode.

CITATION LIST

Patent Literature

PTL 1: JP 2004-290109 A
PTL 2: JP 2010-502962 A
PTL 3: U.S. Pat. No. 9,719,961

SUMMARY OF INVENTION

Technical Problem

However, the conventional configuration has a problem that it is difficult to improve the recovery rate of the target biological substance.

For example, the configurations of PTLs 1 and 2 are configurations in which the hole is formed in the middle of the gel, the biological substance that has reached the recovery hole continues electrophoresis even after reaching the recovery hole, and thus, it is difficult to recover the target biological substance with high efficiency.

Note that two recovery chambers, which are electrically and physically separated, are required in the configuration of PTL 3, and there is a problem that the required area and volume increase accordingly.

Therefore, an object of the present invention is to provide an electrophoresis device and a biological substance recovery method capable of improving a recovery rate of a target biological substance with a simple configuration.

Further, an object is to provide such an electrophoresis device and a biological substance recovery method that enables efficient execution of suspension and supernatant removal in particular.

Solution to Problem

An example of an electrophoresis device according to the present invention is an electrophoresis device used to separate a biological substance using a separation medium, the electrophoresis device including: a recovery hole configured to recover a separated target biological substance, the recovery hole being configured to be capable of accommodating a solvent capable of suspending the target biological substance; a buffer tank configured to accommodate a buffer solution and provided below the recovery hole; and a membrane disposed between the recovery hole and the buffer tank.

Further, an example of a biological substance recovery method according to the present invention is a biological substance recovery method using the above-described electrophoresis device, the method including, before the target biological substance reaches the recovery hole:
 removing the buffer solution in the recovery hole;
 cleaning an inside of the recovery hole using a cleaning liquid; and
 injecting the solvent into the recovery hole. The biological substance recovery method further includes recovering the target biological substance after the target biological substance reaches the recovery hole.

Advantageous Effects of Invention

According to the electrophoresis device and the biological substance recovery method according to the present invention, the recovery rate of the target biological substance can be improved with the simple configuration.

Further, in particular, the suspension and the supernatant removal can be performed efficiently.

DESCRIPTION OF EMBODIMENTS

The same reference signs will be attached to those having the same function in the entire drawing for describing the present embodiment, and the repetitive description thereof will be omitted in some cases. Further, the present invention is not construed as being limited to the description of the embodiment to be described below. Although the present invention is defined by the appended claims, it is easily understood by those skilled in the art that the specific configuration thereof can be changed within a scope not departing from the spirit or gist thereof.

Positions, sizes, shapes, ranges, and the like of the respective components illustrated in the drawings and the like do not always indicate actual positions, sizes, shapes, ranges and the like in order to facilitate understanding of the invention. Therefore, the present invention is not necessarily limited to the positions, sizes, shapes, ranges, and the like disclosed in the drawings and the like.

Components expressed by the singular in the present specification are intended to include the plural unless clearly indicated in the context.

First Embodiment

An electrophoresis device and a biological substance recovery method according to a first embodiment will be described with reference to FIGS. 1 to 3.

Figure 1:
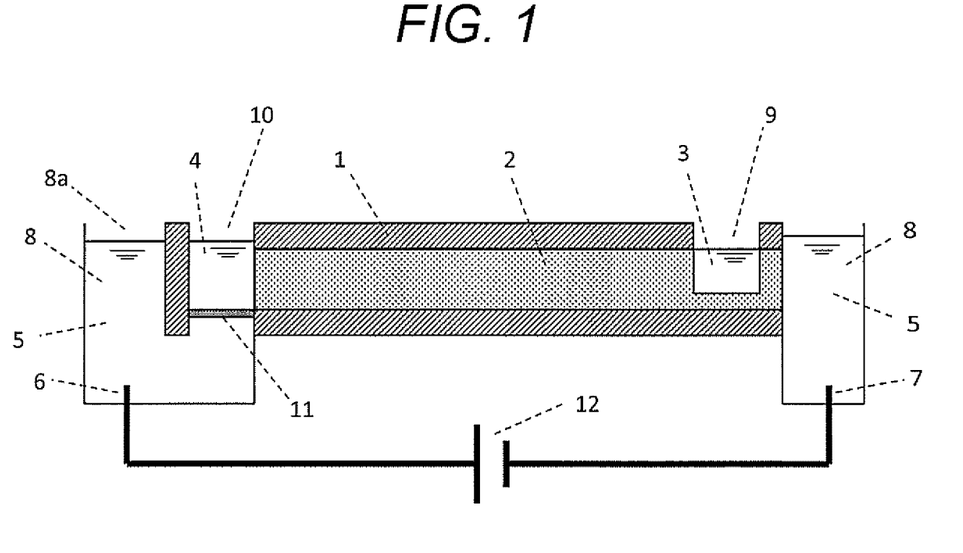
FIG. 1 is a vertical sectional view of an electrophoresis unit according to a first embodiment of the present invention.

FIG. 1 is a vertical sectional view of an electrophoresis unit according to the first embodiment. The electrophoresis unit is an electrophoresis device used to separate a biological substance using a separation medium. In the example of FIG. 1, the separation medium is a gel 2, and an insulation 1 covering the gel 2 is provided.

The electrophoresis unit includes a positive electrode 6 and a negative electrode 7 which are configured to apply a voltage. A power supply 12 is connected to the positive electrode 6 and the negative electrode 7 such that a voltage can be applied between the positive electrode 6 and the negative electrode 7. Although not illustrated, a voltage control device that controls the operation of the power supply 12 may be connected to the power supply 12.

The electrophoresis unit is provided with buffer tanks 8 configured to accommodate a buffer solution 5. The buffer tanks 8 are provided respectively for the positive electrode 6 and the negative electrode 7, and the positive electrode 6 and the negative electrode 7 are each immersed in the buffer solution 5 in a buffer tank 8. Although specific structures of the positive electrode 6 and the negative electrode 7 are not particularly illustrated in FIG. 1, those skilled in the art can appropriately dispose the positive electrode 6 and the negative electrode 7 so as to generate an electric field in the electrophoresis unit in the state of being insulated from each other.

Note that a case where a target biological substance to be recovered is a nucleic acid will be described as an example hereinafter. Since the nucleic acid is negatively charged, a direction of electrophoresis is opposite to a direction of the electric field, and the electrophoresis is performed from the negative electrode 7 side toward the positive electrode 6 side. Note that, in a case where a positively charged biological substance is recovered, the orientation of the electrophoresis unit is reversed, or the positive electrode 6 and the negative electrode 7 are reversely disposed.

The gel 2 is an example of a separation medium used to separate the target biological substance and an unnecessary substance. As the gel 2, for example, a known gel such as agarose gel or polyacrylamide gel can be used. A thickness of the gel 2 is not particularly limited, but is preferably 2 to 18 mm from the viewpoint that a band of the biological substance obtained by electrophoresis is sharp and easy to visually recognize. Note that the thickness of the gel 2 is not necessarily constant.

In relation to the gel 2, an injection hole 3 and a recovery hole 4 are provided. The injection hole 3 has a structure through which a sample containing a biological substance (target biological substance) that needs to be separated is injected, and enables injection of a mixture of biological substances having various molecular weights. In the present embodiment, the injection hole 3 is formed as a recess that is open toward an upper surface at or in the vicinity of one end of the gel 2. Since the injection hole 3 is provided, an injection operation can be easily performed.

The biological substance is injected into the injection hole 3 as an injection solution mixed with a liquid having a specific gravity larger than that of the buffer solution 5. Examples of a solvent in which the biological substance is mixed include an aqueous glycerol solution and sugar water. In a case where the solvent is the aqueous glycerol solution, a glycerol concentration can be, for example, 6%. A viscosity of the injection solution can be, for example, 1 mPa·s.

The recovery hole 4 is a structure configured to recover the separated target biological substance (for example, biological substance having a target molecular weight). In the present embodiment, the recovery hole 4 is formed as a recess that is open toward an upper surface at or in the vicinity of one end (end on the opposite side to the injection hole 3) of the gel 2. Since the recovery hole 4 is provided, a recovery operation can be easily performed.

An interval between the injection hole 3 and the recovery hole 4 can be freely set, but the recovery hole 4 is preferably provided in the vicinity of a position where the biological substance having the target molecular weight appears as a band. This position can be appropriately designed according to a composition (for example, gel concentration) of the separation medium, a molecular weight of the target biological substance, a molecular weight of the unnecessary substance (for example, a substance that is desirably discarded to be distinguished from the target biological substance), and the like.

Furthermore, in the present embodiment, a part (one surface) of side surfaces of the recovery hole 4 is constituted by an end surface of the gel 2, and the other part thereof is constituted by a structure other than the gel 2. Specifically, the rest of the side surfaces is constituted by the insulation 1. However, a specific configuration of the recovery hole 4 is not limited thereto, and for example, the entire side surface of the recovery hole 4 can be formed using the gel 2.

Examples of a method for forming the injection hole 3 and the recovery hole 4 include, but are not particularly limited to, a method of inserting a comb before solidifying the gel 2, a method of excising the solidified gel 2 to form the injection hole 3 and the recovery hole 4, and a method of melting the solidified gel 2 with heat to form the injection hole 3 and the recovery hole 4.

The insulation 1 has an upper opening 9 forming an opening of the injection hole 3 and an upper opening 10 forming an opening of the recovery hole 4. The insulation 1 can be configured as an insulating container (chamber), and can have a shape that covers the gel 2, the injection hole 3, and the recovery hole 4, for example. Since such an insulation 1 is provided, it is possible to appropriately form a current path while physically supporting a structure of the electrophoresis unit.

Although the injection hole 3 and the recovery hole 4 are substantially rectangular parallelepipeds in the present embodiment, the structures, shapes, sizes, and the like thereof are not limited to those illustrated in the drawings. The structures, shapes, sizes, and the like of the injection hole 3 and the recovery hole 4 can be freely set. Dimensions in a width direction (that is, dimensions in the horizontal direction orthogonal to the direction of the electric field, which does not appear in FIG. 2) of the injection hole 3 and the recovery hole 4 may be equal or different. Further, it is also possible not to provide the injection hole 3 depending on a structure of an injection position of the sample.

The recovery hole 4 is configured to be capable of accommodating the solvent. The solvent is capable of suspending the target biological substance. When the target biological substance is present in the recovery hole 4, it is possible to recover the target biological substance together with the solvent by recovering a solution in the recovery hole 4.

The buffer tank 8 on the positive electrode 6 side is provided below the recovery hole 4. More strictly, at least a part of the buffer tank 8 is provided so as to overlap at least a part of the recovery hole 4 (the entire recovery hole 4 in the example of FIG. 1) when viewed from the vertical direction.

A membrane 11 is disposed between the recovery hole 4 and the buffer tank 8. That is, an upper surface of the membrane 11 is in contact with the solvent or solution in the recovery hole 4, and a lower surface of the membrane 11 is in contact with the buffer solution 5 in the buffer tank 8. In the present embodiment, the membrane 11 is disposed horizontally, but need not be strictly horizontal.

In the present embodiment, a part of the buffer tank 8 is provided on the lateral side of the recovery hole 4. Further, the buffer tank 8 has an opening 8a that is open upward. The opening 8a is an opening provided in a portion other than a portion where the membrane 11 is disposed. Since the opening 8a is provided, it is possible to easily perform work of supplying the buffer solution 5.

Figure 2:
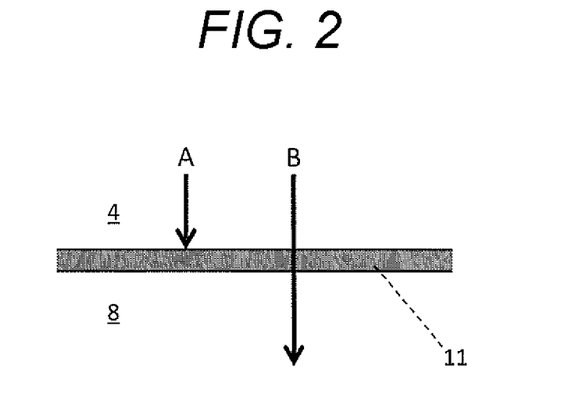
FIG. 2 is a schematic view illustrating an example of properties of a membrane of FIG. 1.
Figure 3:
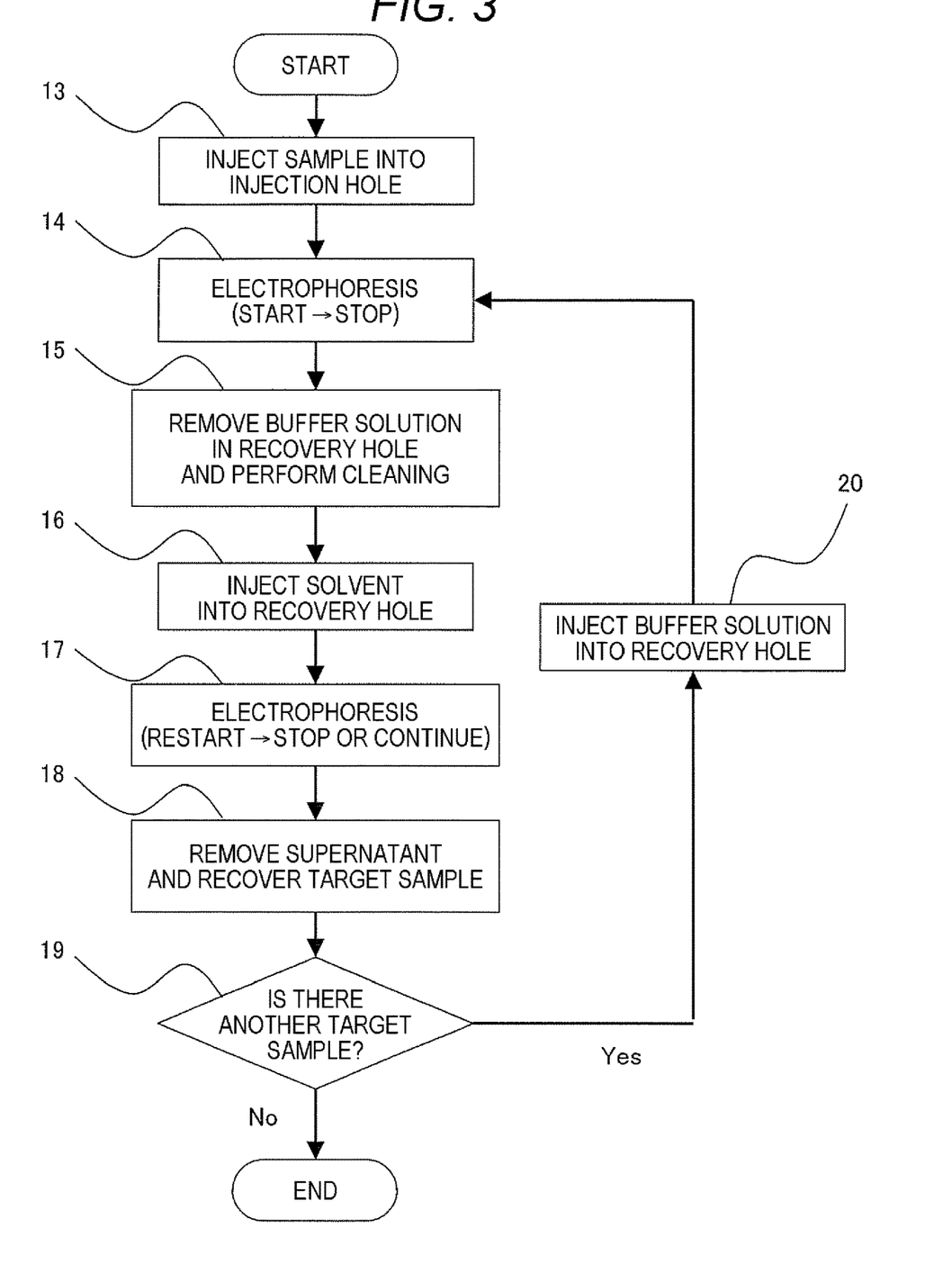
FIG. 3 is a workflow diagram illustrating a separation and recovery workflow by the electrophoresis unit of FIG. 1.

FIG. 2 is a schematic view illustrating properties of the membrane 11. The membrane 11 has any property, but, from the viewpoint of efficiently recovering only the target biological substance, is preferably configured to allow the target biological substance to remain in the recovery hole 4 as indicated by an arrow A and ions other than the target biological substance to be transmitted to the buffer tank 8 as indicated by an arrow B.

As an example, the membrane 11 is preferably configured to inhibit permeation of the target biological substance, and is more preferably configured to substantially prevent the permeation. As another example, the membrane 11 is preferably configured to allow permeation of the ions other than the target biological substance, and is more preferably configured not to substantially inhibit the permeation. As still another example, it is preferable to configure the membrane 11 as a selectively permeable membrane such that a permeability of the membrane 11 with respect to the target biological substance is lower than a permeability of the membrane 11 with respect to at least one other type of ion (that is, ion other than the target biological substance). The properties of the respective examples described above may be combined.

Note that the permeabilities of the membrane 11 with respect to the solvent and the buffer solution can be freely designed. The solvent and/or the buffer solution may be configured to permeate the membrane 11 so as to be partially mixed.

The positive electrode 6 is disposed at a lower position than the membrane 11. The "lower position" means, for example, a position on the lower side in the direction of gravity. According to such a configuration, the target biological substance in the recovery hole 4 can be guided toward the membrane 11 by the electric field so that a recovery rate is improved.

The positive electrode 6 is disposed in a region that is not a region immediately below the membrane 11. That is, the positive electrode 6 and the membrane 11 are disposed so as not to overlap each other when viewed from the vertical direction. According to such a configuration, an air bubble generated in the positive electrode 6 is suppressed from coming into contact with the membrane 11 even when the positive electrode 6 is disposed at the lower position than the membrane 11 so that the function of the membrane 11 is appropriately maintained.

Although the target biological substance (at least a part thereof) adheres to the membrane 11, the membrane 11 forms a bottom surface of the recovery hole 4 according to a positional relationship between the recovery hole 4 and the buffer tank 8. Therefore, it is possible to efficiently perform work of suspending the target biological substance adhering to the membrane 11 by a suspension device (for example, a pipette) inserted from the recovery hole 4. More specifically, it is possible to efficiently perform the suspension of the target biological substance as compared with a case where the membrane 11 forms a side surface of the recovery hole 4.

Further, since the membrane 11 forms the bottom surface of the recovery hole 4, most of the target biological substance migrates to the vicinity of the bottom surface of the recovery hole 4. Therefore, the amount of the target biological substance present in an upper portion inside the recovery hole 4 decreases. Therefore, in a case where a supernatant of the solvent is removed before recovery of the target biological substance, the target biological substance to be removed together with the supernatant can be reduced, and the supernatant removal work can be efficiently performed.

Furthermore, since the membrane 11 forms the bottom surface of the recovery hole 4, the target biological substance adhering to the membrane 11 can be easily observed from above the recovery hole 4.

In this manner, the recovery rate of the target biological substance can be improved with a simple configuration according to the electrophoresis device and the biological substance recovery method of the first embodiment. Further, in particular, it is possible to efficiently perform the suspension and the supernatant removal.

Next, a separation and recovery workflow by the electrophoresis unit of FIG. 1 will be described with reference to FIG. 3. This workflow relates to an electrophoresis method, and particularly represents a biological substance recovery method using the above-described electrophoresis unit.

The electrophoresis method according to the present embodiment includes processes of Steps 13 to 20. Step 13 is a process in which a user injects the injection solution containing the target biological substance into the injection hole 3 of the gel 2.

Step 14 is a process in which the power supply 12 applies an electric field passing through the injection hole 3 and the recovery hole 4 to perform electrophoresis. More specifically, Step 14 includes a process (voltage application start process) of starting application of a voltage for moving the target biological substance toward the recovery hole 4, and a process (voltage application stop process) of stopping the voltage application after the voltage application start process.

Step 15 includes a process (buffer solution removal process) of removing the buffer solution in the recovery hole 4 before the target biological substance reaches the recovery hole 4. Further, optionally, Step 15 includes a process (cleaning process) of cleaning the recovery hole 4 using a cleaning liquid after the buffer solution removal process. This cleaning process may include, for example, a process of injecting the cleaning liquid into the recovery hole 4 and a process of removing the cleaning liquid from the recovery hole 4.

When the buffer solution in the recovery hole 4 is removed and the cleaning is performed in this manner, the performance of removing an unnecessary substance (for example, a non-target biological substance) is enhanced. As a result, the concentration of the target biological substance in a recovered solution can be improved.

Step 16 is a process (solvent injection process) in which the user injects the solvent into the recovery hole 4.

Execution timings of Step 15 and Step 16 can be appropriately designed by those skilled in the art, and can be, for example, before the target biological substance reaches the recovery hole 4. For example, the target biological substance may be stained in advance, and the timings may be determined by visual observation. Alternatively, the time for the target biological substance to reach the recovery hole 4 may be measured or estimated in advance, and the timings may be determined based on an elapsed time. From the viewpoint of efficiently improving the concentration, Step 15 and Step 16 are preferably performed immediately before the target biological substance reaches the recovery hole 4.

Step 17 is a process in which the power supply 12 applies an electric field passing through the injection hole 3 and the recovery hole 4 again to perform electrophoresis. More specifically, Step 17 includes a process (voltage application restart process) of starting application of a voltage for moving the target biological substance toward the recovery hole 4, and a process (voltage application stop process) of stopping the voltage application after the voltage application restart process, which is similar to Step 14 described above.

Through Step 17, the target biological substance reaches the inside of the recovery hole 4. Here, in a case where the membrane 11 is configured not to allow permeation of the target biological substance, the target biological substance remains in the recovery hole 4 even if the stop of the voltage application is delayed (or even if the voltage application is not stopped), and the recovery efficiency of the target biological substance is improved. Furthermore, in a case where the membrane 11 is configured to allow permeation of ions other than the target biological substance, the concentration of the target biological substance in the recovered solution can be improved.

Step 18 is a process (recovery process) in which the user recovers the target biological substance having reached the recovery hole 4 from the recovery hole 4. For example, the user recovers the target biological substance by acquiring the sample solution in the recovery hole 4.

Step 18 may include a process (supernatant removal process) of removing the supernatant of the solvent in the recovery hole 4 and a process (post-removal recovery process) of recovering the target biological substance in the recovery hole 4 after removing the supernatant. The concentration of the target biological substance can be freely selected by removing an appropriate amount of the supernatant in the recovery hole 4 and recovering the remaining solution. The amount of the supernatant that needs to be removed can be obtained, for example, by calculating a difference between the volume of the recovery hole 4 and the amount of the solution that needs to be recovered. Further, the removal of the supernatant and the recovery of the target biological substance can be performed using an appropriate dispensing mechanism (for example, a pipette).

In the post-removal recovery process, for example, the solution containing the target biological substance is recovered after suspension of the solvent.

Here, the last voltage application stop process of Step 17 may be omitted. In such a case, the supernatant removal process of Step 18 is executed while continuing the voltage application after the target biological substance reaches the recovery hole 4. In this case, the voltage application may be stopped after execution of the supernatant removal process and before execution of the post-removal recovery process.

According to such a configuration, the supernatant is removed in the state where the target biological substance is guided downward by the voltage, and thus, the amount of the target biological substance removed together with the supernatant can be reduced, and the higher-concentration target biological substance can be recovered.

Step 19 is a process of determining whether there is another target biological substance. In a case where there is another target biological substance in Step 19, Step 20 is performed. Step 20 is a process (buffer solution injection process) of injecting the buffer solution into the recovery hole 4. After Step 20, the process returns to Step 14 described above, and the respective processes are repeated. That is, additional Step 14 (voltage application start process and voltage application stop process), additional Step 15 (buffer solution removal process and cleaning process), additional Step 16 (solvent injection process), additional Step 17 (voltage application restart process and voltage application stop process), and additional Step 18 (recovery process) are executed, and further, whether there is still another target biological substance is determined in additional Step 19. The above repetition enables recovery of a plurality of types of target biological substances in ascending order of the molecular weight.

In this manner, according to the electrophoresis unit and the related biological substance recovery method of the first embodiment, it is possible to fractionate and recover the target biological substances with high efficiency and high concentration as compared with a conventional method.

Further, such an effect can be obtained with a simple configuration. For example, there is a conventional configuration in which a flow channel of a separation medium branches (PTL 3 and the like). As compared with such a configuration, a flow channel of the separation medium can be made continuous in the electrophoresis unit and the related biological substance recovery method according to the first embodiment of the present invention, and thus, the volume required for processing one sample can be reduced so that the configuration is simplified.

EXAMPLE

Hereinafter, an example of the first embodiment will be described.
(Preparation of Electrophoresis Gel)
An agarose gel having the injection hole 3 and the recovery hole 4 was prepared. The agarose gel was molded by pouring 3% SeaKem (registered trademark) GTG-TAE (manufactured by Lonza) into a plastic container. A comb was inserted before solidification of the agarose gel to form the injection hole 3 having an opening dimension of 1 mm×5 mm and a depth of 3 mm and the recovery hole 4 having an opening dimension of 2 mm×5 mm and a depth of 4 mm. A distance between the injection hole 3 and the recovery hole 4 was set to 20 mm.
(Electrophoresis)
The prepared agarose gel was horizontally placed on an electrophoresis device (Mupid (registered trademark), manufactured by Mupid CO., LTD.), and 1×TAE buffer solution (Tris Acetate EDTA Buffer) was poured to fill the buffer tank 8 almost up to a top surface of the agarose gel. The insides of the injection hole 3 and the recovery hole 4 were also filled with the TAE buffer solution. Thereafter, 1 μL of 6×DNA Loading Dye (manufactured by Thermo Fisher Scientific) was mixed with 5 μL of a sample solution containing nucleic acids of various lengths to form an injection solution, and the injection solution was injected into the injection hole 3.

After the injection of the injection solution, a voltage of 100 V was applied to perform electrophoresis.

Next, the voltage was stopped when a nucleic acid of a target length was present immediately before the recovery hole 4, and the buffer solution in the recovery hole 4 was removed. Next, 40 μL of distilled water was injected and removed after 20 times of pipetting. Next, 40 μL of distilled water was injected as a solvent.

A voltage of 100 V was applied again, and the voltage was stopped after the nucleic acid of the target length had entered the recovery hole to acquire a nucleic acid solution.

The obtained solution was quantified using a nucleic acid quantifier TapeStation 4200 (Agilent Technologies, Ltd.). From results of the quantification, it was confirmed that 80% of the target nucleic acid was recovered without contamination.

Figure 4:
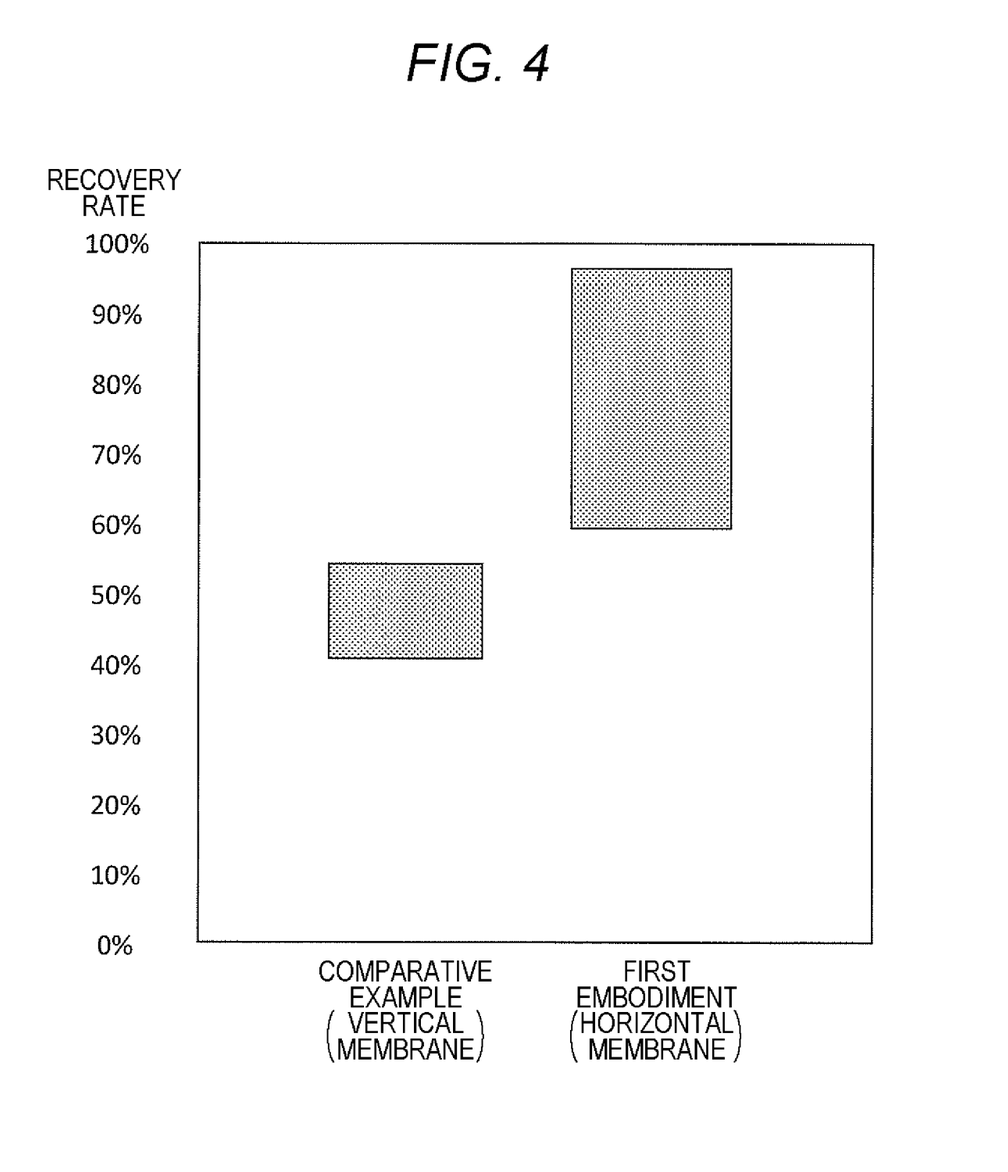
FIG. 4 is a graph of experimental results for describing effects of the electrophoresis unit of FIG. 1.

FIG. 4 is a graph of experimental results for describing effects of the electrophoresis unit according to the first embodiment. In the electrophoresis unit according to the first embodiment, the membrane 11 is horizontally disposed as described above. On the other hand, in an electrophoresis unit according to a comparative example, the membrane 11 was disposed vertically (that is, so as to form a side surface of the recovery hole 4), and a bottom surface of the recovery hole 4 was formed by the insulation 1.

The same experimental conditions were applied. A recovery rate was measured using 25 ng of a DNA sample of *E. coli* as a sample (target biological substance). A voltage of 100 V was applied, and a migration time was 40 minutes. As the gel 2, 3% Seakem GTG-TAE was used. Qubit dsDNA Kit was used for quantification of the target biological substance.

As illustrated in FIG. 4, the recovery rate was only about 40% to 55% in the comparative example, but a high recovery rate of about 60% to 95% could be obtained in the electrophoresis unit according to the first embodiment.

REFERENCE SIGNS LIST 1 insulation
2 gel (separation medium)
3 injection hole
4 recovery hole
5 buffer solution
6 positive electrode
7 negative electrode
8 buffer tank (8*a* opening)
9, 10 upper opening
11 membrane
12 power supply

The invention claimed is:

1. An electrophoresis device configured to separate a biological substance with a separation medium, the electrophoresis device comprising:
   a recovery hole configured to recover a separated target biological substance, the recovery hole being configured to be capable of accommodating a solvent capable of suspending the target biological substance;
   a buffer tank configured to accommodate a buffer solution and provided below the recovery hole; and
   a membrane disposed between the recovery hole and the buffer tank,
   wherein the target biological substance is one type of ion.

2. A biological substance recovery method using the electrophoresis device according to claim 1, the biological substance recovery method comprising, before the target biological substance reaches the recovery hole:
   removing the buffer solution in the recovery hole;
   cleaning an inside of the recovery hole using a cleaning liquid; and
   injecting the solvent into the recovery hole,
   the biological substance recovery method further comprising recovering the target biological substance after the target biological substance reaches the recovery hole.

3. A biological substance recovery method using the electrophoresis device according to claim 1, the biological substance recovery method comprising:
   removing a supernatant of the solvent in the recovery hole after the target biological substance reaches the recovery hole; and
   recovering the target biological substance in the recovery hole after removing the supernatant.

4. The biological substance recovery method according to claim 3, wherein the removing the supernatant of the solvent is performed while continuously applying a voltage.

5. The electrophoresis device according to claim 1, wherein the buffer tank has an opening that is open upward and provided in a portion other than a portion where the membrane is disposed.

6. The electrophoresis device according to claim 1, further comprising a positive electrode and a negative electrode configured to apply a voltage, wherein the positive electrode is disposed at a lower position than the membrane.

7. The electrophoresis device according to claim 6, wherein the positive electrode is installed in a region that is not a region immediately below the membrane.

8. The electrophoresis device according to claim 1, further comprising an insulation that covers the separation medium and the recovery hole.

9. The electrophoresis device according to claim 1, further comprising an injection hole through which a sample containing the target biological substance is injected.

10. The electrophoresis device according to claim 1, wherein a permeability of the membrane with respect to the target biological substance is lower than a permeability of the membrane with respect to at least one other type of ion.

11. The electrophoresis device according to claim 10, wherein the membrane does not allow permeation of the target biological substance but allows permeation of the at least one other type of ion.

\* \* \* \* \*